July 13, 1954  B. S. MILLER ET AL  2,683,682
DIFFERENTIAL INACTIVATION OF ENZYMES
Filed Feb. 6, 1950  2 Sheets-Sheet 2

INVENTORS.
BYRON S. MILLER &
JOHN A. JOHNSON
BY Stowell & Evans
ATTORNEYS

Patented July 13, 1954

2,683,682

UNITED STATES PATENT OFFICE 2,683,682

DIFFERENTIAL INACTIVATION OF ENZYMES

Byron S. Miller and John A. Johnson, Manhattan, Kans., assignors to Research Corporation, New York, N. Y., a corporation of New York Application February 6, 1950, Serial No. 142,622

4 Claims. (Cl. 195—66)

This invention relates to the differential inactivation of enzymes and more especially to the differential inactivation of alpha-amylase in proteinase in a mixture of the two enzymes in aqueous solution.

An object of the invention is to provide a process for preparing from an enzymatic composition including alpha-amylase and proteinase a composition in which one of the named enzymes is inactivated or substantially reduced in activity while the activity of the other named enzyme remains high or substantially unimpaired.

Another object is to provide a process for preparing from an enzymatic composition having both alpha-amylase and proteinase activities a composition exhibiting high alpha-amylase activity and low or substantially negative proteinase activity.

Another object is to provide a process for the preparation of an enzymatic composition having substantial proteinase activity and minimal alpha-amylase activity from an enzymatic composition originally showing substantial activities of both alpha-amylase and proteinase.

These and other objects as may appear hereinafter are realized in a process for differentially inactivating one of the enzymes of the group consisting of proteolytic enzymes and amylolytic enzymes in an aqueous solution of a mixture thereof which comprises adjusting the hydrogen ion concentration of the solution to within the limits pH 3.0 to pH 4.5 and pH 7.0 to pH 10.5 and maintaining the solution within said limits for a time and at a temperature effective to substantially inactivate one of the enzymes while retaining the other of the enzymes in substantially active condition.

Within the limits of pH indicated and on the alkaline side, the proteinase fraction is substantially inactivated without materially decreasing the alpha-amylase activity, while on the acid side, the amylase fraction is largely inactivated without substantially affecting the proteinase activity.

The process may be carired out over a fairly wide range of temperatures from as low as slightly above the normal freezing point of water to as high as 60° C. or somewhat higher. In general, the process proceeds more rapidly at higher temperatures than at lower temperatures, being completed, in general, with one-half hour or less at the higher temperatures and requiring up to 20 hours for practical completion at the lower temperatures.

Enzyme mixtures derived from various sources such as cereals, fungi and the like may be purified in accordance with the invention.

In accordance with the invention, the reduction in proteolytic activity is assisted by the addition of a soluble halide salt, such as a water-soluble bromide or a chloride, for example the sodium or calcium salt, when working under alkaline conditions. In neutral or slightly acid solution, the addition of halide salt, especially in concentrations greater than about 2.0 molar, is effective to inactivate the proteinase, at least in substantial part, without greatly affecting the amylase.

The invention will be described with greater particularity and other of its aims and advantages will be in part apparent and in part pointed out in the following detailed description taken in connection with the accompanying drawing in which.

Figure 5:
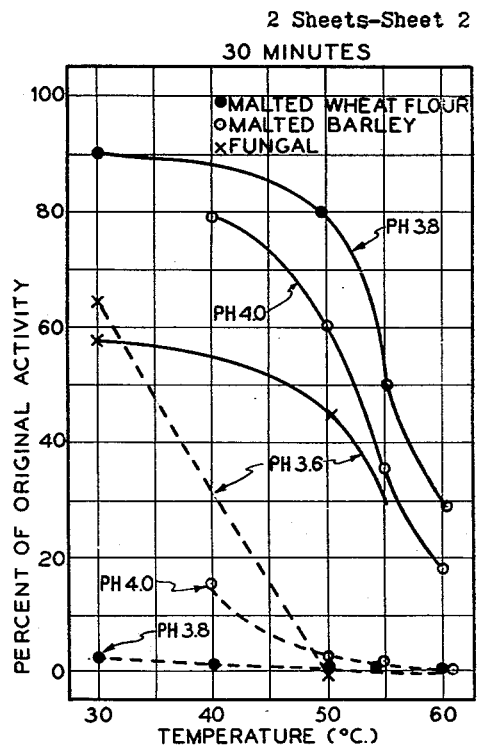
Figure 4:
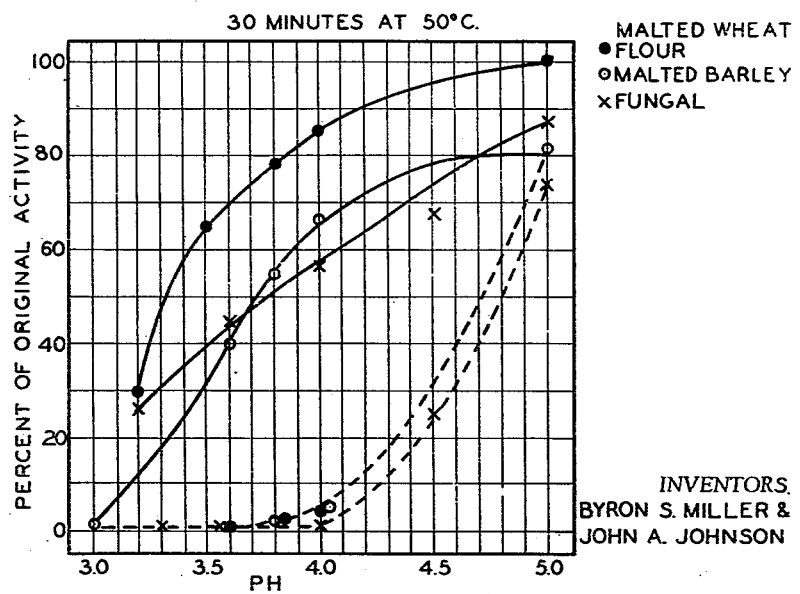

Fig. 4 is a graph representing the stabilities of these enzymes in extracts standing for 30 minutes at 50° C. at various hydrogen ion concentrations in the acid range; and Fig. 5 is a graph representing the stabilities of these enzymes in extracts having hydrogen ion concentrations in the range pH 3.6 to 4.0 standing for 30 minutes at various temperatures in range 30° C. to 60° C.

MANIPULATIVE PROCEDURE

The procedure by which the data graphically summarized in Figs. 1 to 5 are obtained is as follows. The malted wheat flour or malted barley is finely ground and extracted with distilled water or 0.2% calcium chloride solution is distilled water in the ratio of 2 g. of flour or barley to 5 ml. of extractant. The fungal concentrate is extracted in the ratio of 2 mg. of concentrate to 1 ml. of extractant. Other ratios of enzyme active material to extractant also may be used. The extractions are performed by mixing the materials with the extractants and allowing the mixtures to stand for 1 hour at 30° C. with occasional stirring, after which the mixtures are filtered and centrifuged to yield clear liquid extracts. Since the alpha-amylase is more stable in the presence of 0.2% calcium chloride, the calcium chloride solution is used as extractant where the proteinase is to be inactivated and as much as possible of the alpha-amylase activity is to be retained in the aqueous extracts. Where the alpha-amylase is to be inactivated with high retention of proteolytic activity, distilled water is used as extractant. Of course, distilled water may be used in both cases, if desired.

The alpha-amylase activities of the clarified extracts are determined by the procedure of Sandstedt, Kneen, and Blish, Cereal Chemistry, vol. 16, pages 712-723 (1939) and the proteolytic activities are determined by the Ayre-Anderson procedure as modified by Miller, Assoc. Off. Agr. Chem. Journ., vol. 30, pages 659-669 (1947).

Preparatory to treatment, the pH values of the clarified extracts are adjusted to the desired values by the addition of 1.0 N sodium hydroxide or 1.0 N sulfuric acid. Other concentrations of acid and base also may be used.

Treatment consists in allowing the extracts to stand under the indicated conditions.

After treatment, the solution is quickly brought to a temperature of 30° C. and the pH is adjusted to a suitable value within the range 5.0 to 7.0 to give maximum stability to the enzymes.

The enzyme activities are redetermined after treatment.

THE INACTIVATION OF PROTEINASE WITH SUBSTANTIAL RETENTION OF ALPHA-AMYLASE

Figure 1:
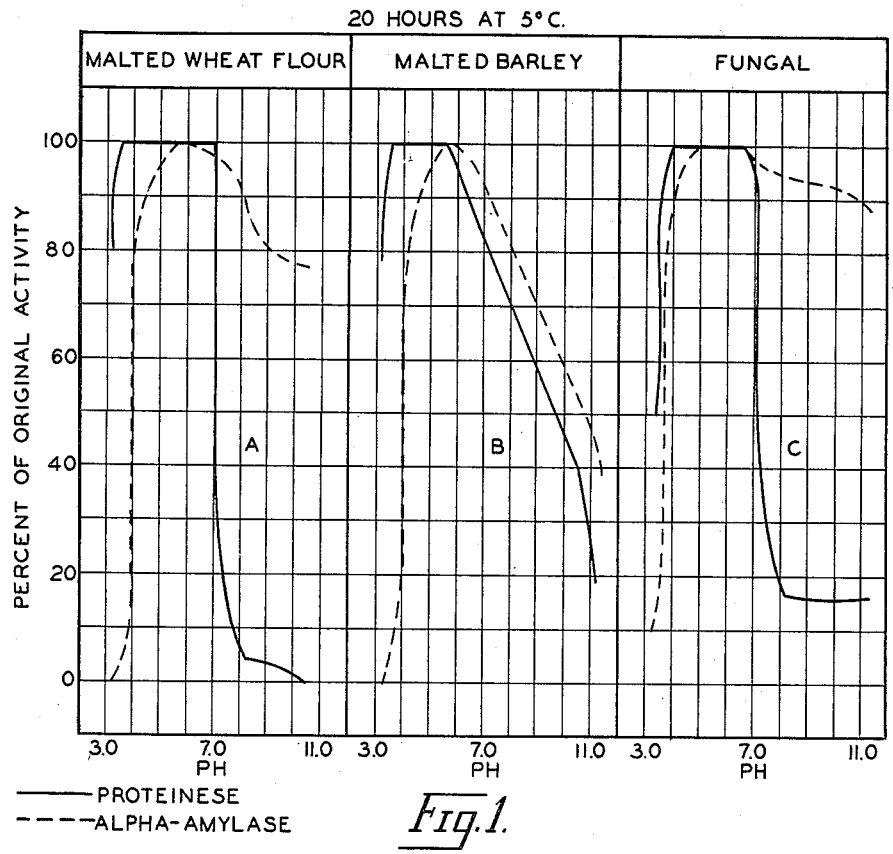
Fig. 1 is a graph representing the stabilities of alpha-amylase and proteinase in extracts of malted wheat flour, malted barley, and a fungal enzymatic preparation standing for 20 hours at 5° C. at various hydrogen ion concentrations.
Figure 2:
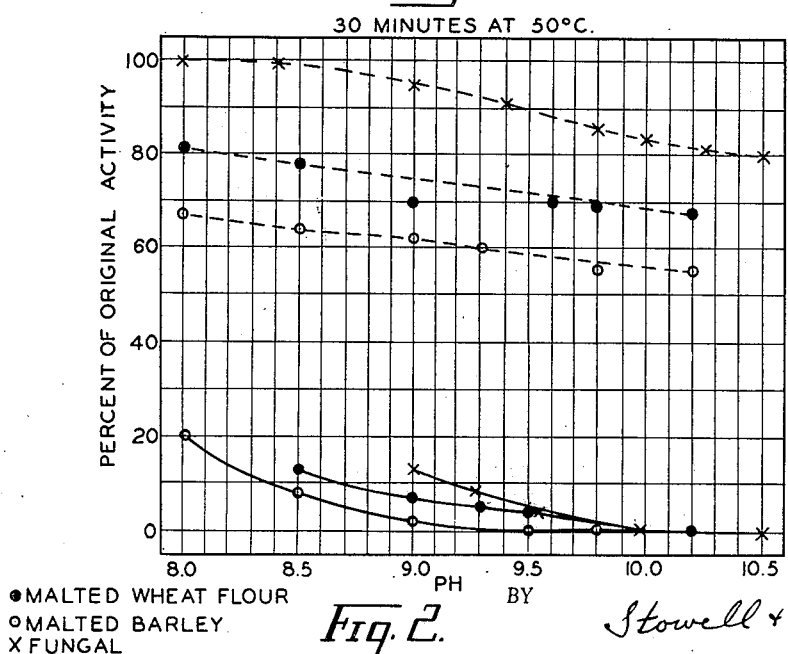
Fig. 2 is a graph representing the stabilities of these enzymes in extracts standing for 30 minutes at 50° C. at various hydrogen ion concentrations in the alkaline range.
Figure 3:
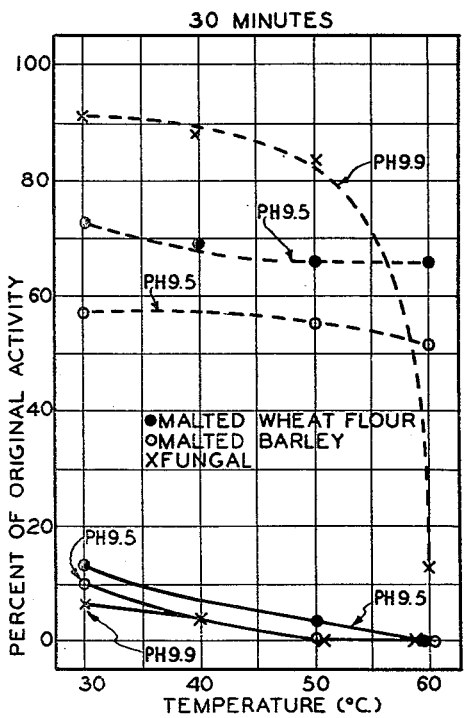
Fig. 3 is a graph representing the stabilities of these enzymes in extracts having hydrogen ion concentrations in the range pH 9.5–9.9 standing for 30 minutes at various temperatures in the range 30° C. to 60° C.

Referring to Figs. 1, 2 and 3, it will be seen that, in general, proteinase is inactivated when the aqueous extract is adjusted to a hydrogen ion concentration within the range pH 7.5 to pH 10.5 and the solution is allowed to stand at the indicated conditions of time and temperature.

As seen in Figs. 1A and 1C, the proteinase activity is substantially reduced without materially reducing the alpha-amylase activity in the case of malted wheat flour and fungal enzyme composition where the extracts are allowed to stand at 5° C. for 20 hours in the range pH 7.0 to pH 10.5 or somewhat greater.

Fig. 2 illustrates the marked reduction in proteinase activity obtained in extracts of malted wheat flour, malted barley and fungal enzyme where the pH is adjusted to from 8.0 to 10.5 and the solutions are allowed to stand for 30 minutes at 50° C. Alpha-amylase activities are largely retained.

Fig. 3 shows the effect of temperatures between 30° C. and 60° C. on the various extracts standing at pH 9.5 to pH 9.9 for 30 minutes. It will be noted that the inactivation of proteinase in extracts of malted wheat flour and malted barley occurs without great reduction of the alpha-amylase activity up to 60° C., but that above about 50° C., the alpha-amylase activity of the fungal extract decreases rapidly.

Although some loss of alpha-amylase activity occurs when treatment conditions are severe enough to eliminate all proteinase activity, we have found that such loss is not unduly great. As shown in Table I, following, alpha-amylase activities of from 65% to 80% remain when the proteinase activity is eliminated.

TABLE I

*Optimum conditions for complete inactivation of proteinase in extracts containing alpha-amylase*

[Percentages of original activity remaining]

| Enzyme source | Treatment | | | Alpha-amylase, Percent | Proteinase, Percent |
|---|---|---|---|---|---|
| | [H+] pH | Temp., ° C. | Time, hrs. | | |
| Malted wheat flour | 9.5 | 60 | 0.5 | 65 | 0 |
| | 10.2 | 50 | 0.5 | 67 | 0 |
| | 10.0 | 5 | 20 | 65 | 0.1 |
| Malted barley | 9.3 | 50 | 0.5 | 60 | 0 |
| Fungal concentrate | 10.5 | 50 | 0.5 | 80 | 0 |

As shown in Table II, following, different samples of malted wheat flours and malted barleys having various original enzymatic activities are subjected to conditions such that the proteinase is practically eliminated. From 56% to 74% of the original alpha-amylase activity remains.

TABLE II

*Inactivation of proteinase for a series of malted wheat flours and malted barleys possessing a wide range of enzyme activity*

MALTED WHEAT FLOURS

[Percentages of original activity remaining]

| Sample No. | Alpha-amylase, units | Proteinase activity, ml. | Treatment | | | Alpha-amylase remaining, Percent | Proteinase remaining, Percent |
|---|---|---|---|---|---|---|---|
| | | | [H+] pH | Temp., ° C. | Time, hrs. | | |
| A | 30.8 | 1.61 | 9.5 | 60 | 0.5 | 67 | 0 |
| B | 60.0 | 2.12 | 9.5 | 60 | 0.5 | 74 | 0 |
| C | 85.7 | 2.52 | 9.5 | 60 | 0.5 | 61 | 0 |
| D | 109.1 | 2.83 | 9.5 | 60 | 0.5 | 60 | 0 |
| A | 30.8 | 1.61 | 10.0 | 5 | 20 | 64 | 0.1 |
| B | 60.0 | 2.12 | 10.0 | 5 | 20 | 67 | 0.1 |
| C | 85.7 | 2.52 | 10.0 | 5 | 20 | 64 | 0.1 |
| D | 109.1 | 2.83 | 10.0 | 5 | 20 | 61 | 0.1 |

MALTED BARLEYS

| 1 | 41.0 | 1.73 | 9.3 | 50 | 0.5 | 66 | 0.1 |
| 2 | 85.7 | 2.70 | 9.3 | 50 | 0.5 | 60 | 0.1 |
| 3 | 126.0 | 3.20 | 9.3 | 50 | 0.5 | 56 | 0.1 |
| 4 | 145.5 | 3.31 | 9.3 | 50 | 0.5 | 62 | 0.1 |
| 5 | 150.0 | 3.69 | 9.3 | 50 | 0.5 | 60 | 0.1 |

From Tables I and II it is seen that optimum conditions for substantial elimination of proteinase activity with maximum retention of alpha-amylase activity require the hydrogen ion concentration of the aqueous extract to be within the limits of about pH 9.0 to pH 10.5. Time and temperature of treatment may be varied within wide limits.

We have found that neutral or slightly acid aqueous extracts of enzymatic compositions containing both alpha-amylase and proteinase are differentially inactivated to yield solutions having predominant alpha-amylase activities by the addition to the extracts of water-soluble chloride or bromide salts such as the sodium or calcium salts in concentrations greater than 2.0 molar. Table III, following, shows the effect of the halides on enzyme extracts.

TABLE III

*The effect of chloride and bromide ions on the differential inactivation of proteinase from alpha-amylase in enzyme extracts*

| Treatment | Chloride ion, molarity | Bromide ion, molarity | Percent activity retained | |
|---|---|---|---|---|
| | | | Amylo-lytic | Proteo-lytic |
| Standing 30° C., 30 min | 0.5 | | 100 | 96.7 |
| Do | [1] 4.3 | | 94.2 | 74.8 |
| Heated 50° C., 30 min | | [3] 4.3 | 81.0 | 48.8 |
| Do | [2] 4.3 | | 93.0 | 48.8 |

[1] Sodium chloride.
[2] Calcium chloride.
[3] Sodium bromide.

It will be noted from Table III that greater efficiency of differential inactivation of proteinase occurs at the higher temperatures.

We have also found that the conjoint employment of pH control and water-soluble halides enables equivalent degree of differential inactivation of proteinase to be obtained at lower hydroxyl ion concentrations in the alkaline range and at lower temperatures. The concentration of the halide salt should be greater than about 2.0 molar.

THE INACTIVATION OF ALPHA-AMYLASE WITH SUBSTANIAL RETENTION OF PROTEINASE

Referring to Figs. 1, 4 and 5, it is seen that alpha-amylase is substantially inactivated leaving a relatively high proteinase activity when the pH is adjusted to within the limits 3.0 to 4.7 and the aqueous extract is allowed to stand at such pH for a sufficient length of time.

In the case of malted wheat flour and malted barley extracts a pH of between 3.0 and 4.0 will produce substantial inactivation of the alpha-amylase portion in 20 hours at 5° C., as shown in Fig. 1.

As seen in Fig. 4, on standing 30 minutes at 50° C., aqueous extracts of malted wheat flour, malted barley and fungal enzyme composition exhibit substantial reduction or elimination of amylolytic activity in the pH range from about 3.5 to about 4.7.

Referring to Fig. 5, it is seen that at a pH value between 3.8 and 4.0 aqueous extracts of malted wheat flour and malted barley show good differential inactivation of alpha-amylase at temperatures up to about 50° C. when standing for 30 minutes. The fungal enzyme mixture extract shows good differential inactivation between about 35° C. and 50° C. when standing for 30 minutes.

The optimum conditions for maximum retention of proteinase together with complete or nearly complete inactivation of alpha-amylase are summarized in Table IV.

TABLE IV

*Optimum conditions for differential inactivation of alpha-amylase in extracts containing proteinase*

[Percentages of original activity remaining]

| Enzyme source | Treatment | | | Alpha-amylase, Percent | Proteinase, Percent |
|---|---|---|---|---|---|
| | (H+) pH | Temp., °C | Period, hrs. | | |
| Malted wheat flour | 3.6 | 50 | 0.5 | 0.3 | 66 |
| | 3.6 | 5 | 20 | 3.5 | 60 |
| Malted barley | 3.3 | 50 | 0.5 | 0 | 29 |
| | 3.8 | 50 | 0.5 | 2 | 54 |
| | 3.6 | 5 | 20 | 0.4 | 85 |
| Fungal concentrate | 3.6 | 50 | 0.5 | 0 | 45 |

A pH of from about 3.3 to about 3.8 is optimum with time and temperature varying over wide ranges.

In Table V is shown the differential inactivation at pH 3.6 of amylase in extracts of a series of malted wheat flours and malted barleys possessing a wide range of enzyme activity.

TABLE V

*Inactivation of alpha-amylase for a series of malted wheat flours and malted and malted barleys possessing a wide range of enzyme activity*

MALTED WHEAT FLOURS

[Percentages of original activity remaining]

| Sample No. | Alpha-amylase, units | Proteinase activity, ml. | Treatment | | | Alpha-amylase, Percent | Proteinase, Percent |
|---|---|---|---|---|---|---|---|
| | | | [H+] pH | Temp., °C. | Time, hrs. | | |
| A | 30.8 | 1.61 | 3.6 | 50 | 0.5 | 0.3 | 65 |
| B | 60.0 | 2.12 | 3.6 | 50 | 0.5 | 0.3 | 77 |
| C | 85.7 | 2.52 | 3.6 | 50 | 0.5 | 0.6 | 79 |
| D | 109.1 | 2.83 | 3.6 | 50 | 0.5 | 0.5 | 66 |
| A | 30.8 | 1.61 | 3.6 | 5 | 20 | 3.6 | 84 |
| B | 60.0 | 2.12 | 3.6 | 5 | 20 | 3.4 | 81 |
| C | 85.7 | 2.52 | 3.6 | 5 | 20 | 3.7 | 78 |
| D | 109.1 | 2.83 | 3.6 | 5 | 20 | 3.7 | 82 |

MALTED BARLEYS

| 1 | 41.0 | 1.73 | 3.6 | 5 | 20 | 0.5 | 86 |
| 2 | 85.7 | 2.70 | 3.6 | 5 | 20 | 0.3 | 79 |
| 3 | 126.3 | 3.20 | 3.6 | 5 | 20 | 0.4 | 80 |
| 4 | 145.5 | 3.31 | 3.6 | 5 | 20 | 0.2 | 86 |
| 5 | 150.0 | 3.69 | 3.6 | 5 | 20 | 0.4 | 81 |

The purified solutions obtained by the process of the invention may be employed as such or may be further refined or concentrated.

From the foregoing description it will be seen that the present invention provides a practical process for differentially inactivating one of the enzymes of a mixture of proteolytic and amylolytic enzymes.

We claim:

1. A process for recovering active alpha-amylolytic enzymes substantially free of active proteolytic enzymes from mixtures of the two which comprises adjusting the pH of an aqueous solution containing active proteolytic enzymes and active amylolytic enzymes to between 7.5 and 10.5 and maintaining said solution at a temperature between about 5° and 60° C. for between about ½ and 20 hours, said time being shorter the higher the temperature and sufficient to substantially free the solution of active proteolytic enzymes while retaining a preponderance of the active alpha-amylolytic enzymes present in said aqueous solution.

2. A process for recovering active alpha-amylolytic enzymes substantially free of active proteolytic enzymes from mixtures of the two which comprises adjusting the pH of an aqueous solution containing active proteolytic enzymes and active amylolytic enzymes to between 7.5 and 10.5, heating the solution to a temperature between about 30° and 60° C., maintaining said solution at said temperature for about ½ hour to form a solution substantially free of active proteolytic enzymes and containing a preponderance of the active alpha-amylolytic enzymes present in said aqueous solution.

3. A process as claimed in claim 1 wherein a water-soluble halide salt is added to said aqueous solution in a concentration of at least 2 molar.

4. A process as claimed in claim 3 wherein said halide salt is an alkali metal chloride.

References Cited in the file of this patent

UNITED STATES PATENTS

| Number | Name | Date |
|---|---|---|
| 1,634,310 | Takamine | July 5, 1927 |
| 2,466,172 | Kesler et al. | Apr. 5, 1949 |

OTHER REFERENCES

Annual Review of Biochemistry, vol. XIV, 1945, page 31.

Sumner et al., Enzymes (1947), 2nd ed., pages 19, 164.

Miller et al., Cereal Chemistry 25 (1948), pages 185–186.

Miller et al., Cereal Chemistry 26 (1949), pages 359–371.